United States Patent
Offer

(10) Patent No.: US 6,745,023 B1
(45) Date of Patent: Jun. 1, 2004

(54) CELLULAR MOBILE RADIO NETWORK AND METHOD FOR OPERATING SUCH A NETWORK

(75) Inventor: Gero Offer, Gilching (DE)

(73) Assignee: Siemens Aktiengesellschaft, Munich (DE)

( * ) Notice: Subject to any disclaimer, the term of this patent is extended or adjusted under 35 U.S.C. 154(b) by 178 days.

(21) Appl. No.: 09/606,593

(22) Filed: Jun. 29, 2000

(30) Foreign Application Priority Data

Jun. 29, 1999 (DE) .......................................... 199 29 753

(51) Int. Cl.[7] .............................................. H04M 1/66
(52) U.S. Cl. ...................................... 455/410; 455/63.1
(58) Field of Search ................................. 455/410, 411, 455/433, 435, 414, 417, 565, 63.1

(56) References Cited

U.S. PATENT DOCUMENTS 5,778,304 A * 7/1998 Grube et al. ................ 455/33.1

FOREIGN PATENT DOCUMENTS

| DE | 197 44 263 C1 | 5/1999 |
| EP | 0 891 110 A1 | 1/1999 |
| GB | 2 300 787 A | 11/1996 |
| GB | 2 334 859 A | 9/1999 |
| WO | WO 98/25433 | * 6/1998 |
| WO | WO 99/55102 | 10/1999 |

OTHER PUBLICATIONS

International Publication WO 99/07167 (Östrup et al.), Feb. 11, 1999.

* cited by examiner

*Primary Examiner*—Lee Nguyen
(74) *Attorney, Agent, or Firm*—Laurence A. Greenberg; Werner H. Stemer; Ralph E. Locher

(57) ABSTRACT

A method for operating a cellular mobile radio network includes the step of allocating authorizations to selected mobile stations for a radio operation in particular in zones where radio interference is hazardous or radio traffic is undesired. The authorizations are stored in a local access authority register. Base stations, which are associated with cells that contain zones which are to be kept free of radio traffic, verify the presence of an authorization for each registering mobile station, and allow or prevent operation of the mobile station depending on the verification result. A control configuration for operating a cellular mobile radio network is also provided.

18 Claims, 1 Drawing Sheet

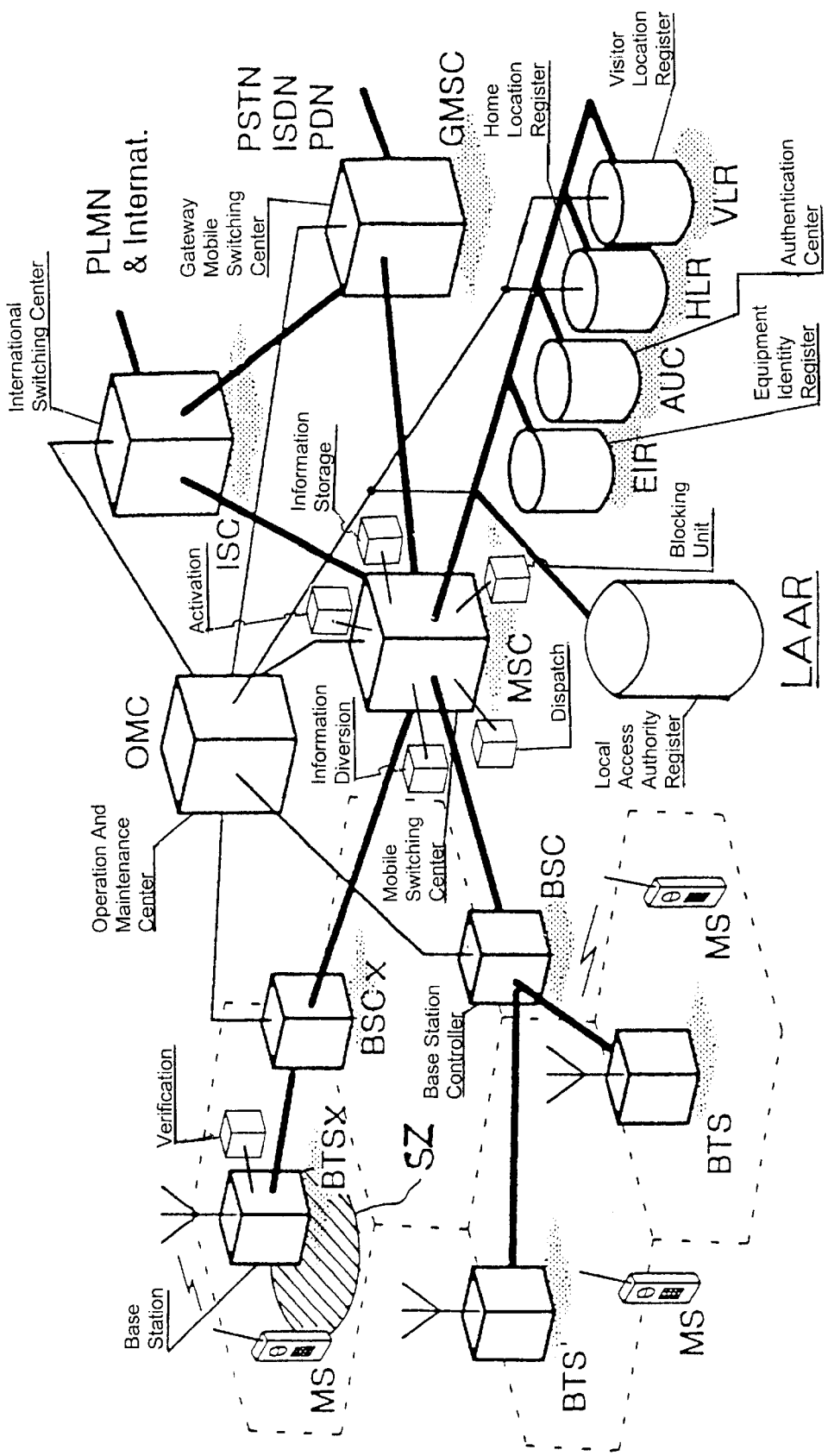

CELLULAR MOBILE RADIO NETWORK AND METHOD FOR OPERATING SUCH A NETWORK

BACKGROUND OF THE INVENTION

Field of the Invention

The invention relates to a special method for operating a cellular mobile radio network in order to ensure the safety of zones where radio interference is hazardous. The invention also relates to a correspondingly configured cellular mobile radio network. The invention further relates to a method of setting up "zones free of mobile radio operation" for other reasons, for example in theaters, at the opera and in restaurants.

The continuing explosive development of mobile radio technology has led to hundreds of millions of mobile telephones being produced and sold, and being in daily use, in developed industrial countries. In these countries, there is virtually no place left in which there is no mobile radio traffic. The mobile radio traffic is, of course, particularly busy at traffic nodes and other focal points of daily life. Some of these zones are highly susceptible to dangers from radio interference due to the company-internal or operation-internal wireless information traffic taking place there, that is to say external radio traffic can lead to serious interference with the internal information processes there.

The danger to airborne traffic and, especially, to airport operation from mobile radio traffic is known in this context. In the past, aircraft accidents have already occurred which were virtually undoubtedly caused by interference from mobile telephones used in an aircraft. Thus, for some time, airline passengers have normally been requested to switch off their mobile telephones before entering an aircraft. However, due to carelessness or when an urgent call is expected, some airline passengers ignore this request, so that it is impossible to reliably ensure the safety of air traffic against interference from mobile radios by making such requests to airline passengers.

Risks similar to those in air traffic exist in clinics, particularly in intensive care zones, in which a large number of wireless information links, particularly between implanted medical-electronic equipment and external programming devices, or emergency paging systems for doctors, are operated. Here also, people having mobile telephones are occasionally requested to switch off their mobile telephones in certain zones. However, such requests cannot be reliably effective in this situation either.

In addition, it has already been tried to use technical devices, in particular jamming transmitters installed in relatively small zones, in order to make it impossible to make mobile telephone calls in safety-relevant zones. However, this has in fact resulted in a disadvantageous effect since mobile telephones react to such jamming by maximizing the transmitted power to search for the network, and thus increase the effect of the interference originating from them, unless the person having the mobile telephone actually switches it off.

SUMMARY OF THE INVENTION

It is accordingly an object of the invention to provide a method for operation a cellular mobile radio network and a control configuration for a cellular mobile radio network which overcome the above-mentioned disadvantages of the heretofore-known methods and devices of this general type and which reliably prevent interference caused by a mobile radio operation, irrespective of the subjective behavior or actions of network subscribers, in zones where radio interference is hazardous or a radio operation is undesired.

With the foregoing and other objects in view there is provided, in accordance with the invention, a method for operating a cellular mobile radio network, which includes the steps of:

allocating, to selected mobile stations, specific authorizations for a radio operation in zones to be kept substantially free of mobile radio traffic;

storing the specific authorizations in a local access authority register or database of a mobile radio network;

verifying a presence of one of the specific authorizations for a mobile station registering with a base station assigned to one of the zones to be kept substantially free of mobile radio traffic; and selectively allowing and blocking an operation of the mobile station registering with the base station, depending on a result of the verifying step.

The invention includes the fundamental idea of forcibly preventing, from the network end, the operation of mobile telephones in zones where radio interference is hazardous or a radio operation is undesired, for example in aircraft and in areas of hospitals. The invention is also based on the realization that there should be specific approved exceptions to this forcible prevention of mobile radio traffic in the corresponding zones, in order to preclude undesirable disadvantageous effects. Such disadvantageous effects could occur if mobile radio traffic, which is desirable or even necessary for the work being carried out in the zones where radio interference is hazardous or a radio operation is undesired, were also to be prevented indiscriminately.

The invention thus provides for the network operator to allocate a specific authorization for mobile radio traffic in radio cells which have zones where radio interference is hazardous or a radio operation is undesired, and for a check for the presence of the appropriate authorization to be carried out for each mobile station registering there, before the mobile station is allowed to carry out mobile radio operations. If there is no specific authorization, specific technical processes—graduated in accordance with preferred embodiments of the invention—are initiated which on the one hand reliably prevent mobile radio traffic from the unauthorized mobile station, and on the other hand are used to limit as far as possible the disadvantages for the user of such a mobile station.

A preferred embodiment of the method according to the invention includes the transmission of the call number of a mobile telephone registering in a zone where radio interference is hazardous or radio traffic is undesired, by the corresponding mobile station to the operation and maintenance center or OMC, which has a special associated local access authority register. The data stored there are used to carry out an immediate check as to whether the mobile station is or is not authorized to carry out mobile radio traffic in this zone, and the registration process is carried out if the result is positive while, if the result is negative, the corresponding call number is inhibited in a limited area and/or for a limited time. This is done via the responsible mobile switching center or MSC.

In accordance with another mode of the invention, the mobile switching center activates an information storage device, such as a mail box, or an information diversion device, such as a call diversion device, if no match is found in the authorization check.

Another preferred embodiment of the method according to the invention provides that, in the latter case—that is to say when there is no relevant access authorization—the mailbox of the mobile station attempting to register is at the same time activated automatically via the mobile switching center. This prevents important messages from being entirely lost for the time when this mobile station is prevented from actively making mobile radio calls.

A further preferred embodiment in this case also provides for a "synthetic" call or service message (SMS) to be delivered to the registering mobile station, in order to inform the user about the existence of the inhibition or blocking, via the mobile switching station. In this case, depending on the specific system architecture, it is either possible to produce a text message on the display or to produce voice information which is output via the earpiece. In principle, of course, the relevant user can also be informed by an actual call from the operation and maintenance center; however, due to the complexity and required expense, this should be regarded as a transitional solution in order to increase user acceptance during introduction of the proposed method.

In accordance with yet another mode of the invention, if no match is found in the comparing step, an initial, time-limited registration for the mobile station is carried out for registering with the base station, and information is generated for notifying, via the mobile switching center, the mobile station of a limited blocking.

In accordance with a further mode of the invention, information is transmitted to the mobile station via the operation and maintenance center or via a memory/output control unit associated with the mobile switching center.

With the objects of the invention in view there is also provided, in a cellular mobile radio network including mobile stations, base stations with respectively assigned radio cells, and a mobile switching center connected to the base stations, a control configuration, including:

a local access authority register for storing specific authorizations relating to an operation of the mobile stations in selected ones of the radio cells, the selected ones of the radio cells containing zones to be kept substantially free of mobile radio traffic;

verification devices provided at given ones of the base stations associated with the selected ones of the radio cells for providing a verification of an authorization of the mobile stations registering with the given ones of the base stations, by interaction with the local access authority register; and a blocking device associated with the mobile switching center for selectively inhibiting a given one of the mobile stations for at least one of a limited time and a limited area.

The partly functional description of features of the invention makes it clear that the device features of the proposed system largely correspond to the method features, especially since the essential features for implementation are databases and access and transmission protocols, which should be regarded both as method elements and apparatus elements.

In a preferred embodiment of the network architecture, the local access authority register mentioned above is in the form of an intelligent network (IN) which, in particular, is associated with the operation and maintenance center of the mobile radio network, where it can expediently be accessed via a special server. The inquiry and answer control, originating from the base station responsible for the relevant radio cell and ending with the mobile switching center which implements any inhibition or blocking, includes provisions which essentially correspond to the provisions used or method steps implemented for equipment authentication by access to the equipment identity register EIR. These include provisions or processes with which a mobile telephone which has been lost is inhibited—with the difference that, for the proposed solution, the inhibition is not fundamentally unlimited throughout the network, but is implemented such that it is limited to the corresponding radio cell where radio interference is hazardous or radio traffic is undesired, or is limited to a predetermined time period.

At present, it is considered that limiting the area covered by the inhibition is particularly worthwhile for the purposes of the proposed solution but, in principle, at least a combination with a time limit is also feasible in order, for example, to allow the inhibition to be maintained for the time period of a flight without incurring considerable data transmission and processing effort in the network just to maintain the inhibition for the mobile station, which is moving quickly while in flight.

The proposed solution can be implemented in an advantageous manner particularly in conjunction with a detailed and exact planning of the radio field, wherein picocells and very small cells are being established. Specifically, the more precisely it is possible to define a zone where radio interference is hazardous or radio traffic is undesired, this zone also being referred to as a "service free zone", the less significant are the limitations necessarily associated with the proposed action, and the higher the level of user acceptance will be. In this context, a differentiated definition of different safety levels is also possible for zones which are to varying degrees prone to experience radio interference or which are endangered by the consequences of mobile radio traffic to different extents. Differentiation is also possible in terms of the authorization profiles of the end users; for example it would be feasible to allocate local authorizations to the ground personnel at airports and to allocate global authorizations to flying personnel, or else to selected employees of the legal authorities or the like. Such details can be controlled on a specialist basis in the course of system planning.

In accordance with another feature of the invention, an information storage device, such as a mail box, is assigned to a mobile station. An activation device for activating an information storage in the information storage device depending on an authorization verification is provided.

In accordance with yet another feature of the invention, an information diversion device, such as a call diversion device, associated with the mobile switching center is provided. An activation device activates the information diversion device depending on an authorization verification.

In accordance with a further feature of the invention, a dispatch device transmits, via the mobile switching center, a call, a service message or any other information suited for notifying a mobile station about a limited blocking.

Other features which are considered as characteristic for the invention are set forth in the appended claims.

Although the invention is illustrated and described herein as embodied in a cellular mobile radio network and a method for operating such a network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic diagram of the system architecture of a GSM mobile radio network.

DESCRIPTION OF THE PREFERRED EMBODIMENTS

Referring now to the single FIGURE in detail, there is shown a schematic illustration of the system architecture of a GSM mobile radio network according to an embodiment of the invention. The fundamental layout of such a network is known per se, and will therefore not be explained in any more detail here. The GSM mobile radio network is a cellular network. The FIGURE shows, by way of example, four radio cells (hexagonals marked by dashed lines) of the GSM mobile radio network. Each of the radio cells is formed by the radio supply area of a respective base station BTS (Base Transceiving Station). In order to allow transmission in a corresponding cell, mobile stations MS must register or log on with the corresponding BTS. A plurality of base stations BTS are controlled jointly by one base station controller BSC, and the calls of the mobile stations in their respective cells are switched jointly via a mobile switching center MSC. Calls to and from the fixed-line network or public switched telephone network are processed by a dedicated switching center GMSC (Gateway MSC).

The operation and maintenance of the entire system are organized by an operation and maintenance center OMC. Conventional GSM systems have available a number of databases for switching and for network management, in particular a home location register HLR, a visitor location register VLR, the authentication center AUC and the equipment identity register EIR. International calls are switched via a connection of the associated MSI (Mobile Subscriber Identity) with an international switching center ISC, if appropriate to another mobile radio network PLMN (Public Land Mobile Network).

The illustrated embodiment assumes that one of the sketched radio cells covers a zone SZ (safety zone) where radio interference is hazardous or endangering (marked as a shaded ellipse) and that the base station BTSX associated with the corresponding radio cell is specially configured, together with its associated controller BSCX, to handle radio operation while observing this safety zone. The major additional system component is a "local access authority register" database which is referred to here by the (non-standard) abbreviation LAAR. The local access authority register LAAR is in the form of an intelligent network and the respectively applicable specific operating authorizations of selected mobile stations are controlled in the LAAR for all radio cells having zones where radio interference is hazardous and/or radio traffic is undesired. The LAAR is linked to the system in fundamentally the same way as the other databases, specifically the EIR and the AUC. Handling details are defined in the GSM protocol.

As soon as a mobile station MS registers with the base station BTSx/BSCx responsible for the zone SZ where radio interference is hazardous, its call number is transmitted via the mobile switching center MSC (inter alia) to the local access authority register LAAR, and a check is carried out to determine whether the call number matches one of the stored call numbers which have a local operating authorization for the corresponding radio cell—or a global operating authorization for all safety-relevant radio cells. If this is the case, an appropriate acknowledgement or return information is produced, and the mobile station can register and carry out normal mobile radio traffic. If, on the other hand, the authorization list does not contain the call number, the mobile station's mailbox is first of all activated automatically via the mobile switching center. Furthermore, a call to the mobile station is generated via the mobile switching center and the operation and maintenance center OMC, in which a predetermined information, which is stored as text or as a voice message, is transmitted, to inform the user of the existence of the imminent limited inhibition or blocking of his/her mobile telephone related to his/her presence in the zone SZ where radio interference is hazardous and the lack of any specific authorization. The mobile station is then inhibited or blocked. Depending on the specific system configuration, the inhibition is cancelled again automatically on leaving the radio cell which contains the safety zone SZ or, possibly, also when the next activation attempt is made outside the relevant radio cell and/or, in some circumstances, after a specific predetermined time has elapsed.

The FIGURE shows an information diversion unit, such as a call diversion unit, an information storage unit, such as a mail box, a blocking unit for blocking a mobile station, a dispatch unit for transmitting information regarding a blocking of the mobile station, and an activation unit for activating the information storage unit or the information diversion unit. The respective units are shown to be associated with the mobile switching center, however it is also possible to have the above-listed units associated or integrated with other appropriate functional units such as the base stations or the operation and maintenance center. The FIGURE further shows a verification unit connected to a base transceiver station BTSX. Likewise, the verification unit may alternatively be associated with some other device, for example, the mobile switching center MSC.

The embodiment of the invention is not limited to the example described here but—depending on the specific system architecture and protocol configuration—a person of skill in the art will be able to implement modifications of the described embodiments of the invention.

I claim:

1. A method for operating a cellular mobile radio network, the method which comprises:

allocating, to selected mobile stations, specific authorizations for a radio operation in zones to be kept substantially free of mobile radio traffic;

storing the specific authorizations in a local access authority register of a mobile radio network;

verifying a presence of one of the specific authorizations for a mobile station registering with a base station assigned to one of the zones to be kept substantially free of mobile radio traffic;

selectively allowing and blocking an operation of the mobile station registering with the base station, depending on a result of the verifying step;

transmitting, with the base station, a call number of the mobile station to the local access authority register when the mobile station registers with the base station;

comparing, in the local access authority register, the call number with a list of stored call numbers of the selected mobile stations authorized to operate in a radio cell associated with the base station;

selectively, registering the mobile station if a match is found in the comparing step and, if no match is found in the comparing step, transmitting an appropriate message to a mobile switching center; and blocking, with the mobile switching center, the mobile station registering with the base station for one of a limited time and a limited area.

2. The method according to claim 1, wherein the allocating step includes allocating authorizations for a radio operation in radio interference hazard zones.

3. The method according to claim 1, which comprises activating, with the mobile switching center, an information storage device, if no match is found in the comparing step.

4. The method according to claim 1, which comprises activating, with the mobile switching center, an information diversion device, if no match is found in the comparing step.

5. The method according to claim 1, which comprises activating, with the mobile switching center, a mailbox for the mobile station registering with the base station, if no match is found in the comparing step.

6. The method according to claim 1, which comprises activating, with the mobile switching center, a call diversion, if no match is found in the comparing step.

7. The method according to claim 1, which comprises:
   carrying out, if no match is found in the comparing step, an initial, time-limited registration for the mobile station registering with the base station; and
   generating information for notifying, via the mobile switching center, the mobile station of a limited blocking.

8. The method according to claim 7, which comprises transmitting, via an operation and maintenance center, further information to the mobile station registering with the base station.

9. The method according to claim 7, which comprises transmitting, via a memory/output control unit associated with the mobile switching center, further information to the mobile station registering with the base station.

10. In a cellular mobile radio network including mobile stations, base stations with respectively assigned radio cells, and a mobile switching center connected to the base stations, a control configuration, comprising:
    a local access authority register for storing specific authorizations relating to an operation of the mobile stations in selected ones of the radio cells, the selected ones of the radio cells containing zones to be kept substantially free of mobile radio traffic;
    verification devices provided at given ones of the base stations associated with the selected ones of the radio cells for providing a verification of an authorization of the mobile stations registering with the given ones of the base stations, by interaction with the local access authority register;
    a blocking device associated with the mobile switching center for selectively inhibiting a given one of the mobile stations for at least one of a limited time and a limited area;
    an information storage device assigned to the given one of the mobile stations; and
    an activation device for activating an information storage in said information storage device depending on the verification provided by one of said verification devices.

11. The control configuration according to claim 10, wherein the zones are radio interference hazard zones.

12. The control configuration according to claim 10, wherein said information storage device is a mailbox.

13. The control configuration according to claim 10, including:
    an information diversion device associated with the mobile switching center; and
    an activation device for activating said information diversion device depending on the verification provided by one of said verification devices.

14. The control configuration according to claim 13, wherein said information diversion device is a call diversion device.

15. The control configuration according to claim 10, including a dispatch device for transmitting, via the mobile switching center, a call for notifying the given one of the mobile stations about a limited blocking.

16. The control configuration according to claim 10, including a dispatch device for transmitting, via the mobile switching center, a service message for notifying the given one of the mobile stations about a limited blocking.

17. The control configuration according to claim 10, including a dispatch device for transmitting, via the mobile switching center, information for notifying the given one of the mobile stations about a limited blocking.

18. The control configuration according to claim 10, wherein the cellular mobile radio network includes an operation and maintenance center, said local access authority register is an intelligent network associated with the operation and maintenance center.

* * * * *